United States Patent
Smith et al.

(10) Patent No.: US 7,370,751 B2
(45) Date of Patent: May 13, 2008

(54) SKEWED SLAT CONTROL SYSTEM FOR ARTICLE CONVEYOR

(75) Inventors: Thomas B. Smith, Rockford, MI (US); Robert W. Gallatin, Grand Rapids, MI (US); Bradley D. Baldwin, Rockford, MI (US)

(73) Assignee: Dematic Corp., Grand Rapids, MI (US)

( * ) Notice: Subject to any disclaimer, the term of this patent is extended or adjusted under 35 U.S.C. 154(b) by 74 days.

(21) Appl. No.: 11/532,690

(22) Filed: Sep. 18, 2006

(65) Prior Publication Data
US 2007/0272520 A1    Nov. 29, 2007

Related U.S. Application Data

(60) Provisional application No. 60/747,953, filed on May 23, 2006.

(51) Int. Cl.
*B65G 45/02* (2006.01)
(52) U.S. Cl. .................. 198/500; 198/806; 198/370.02
(58) Field of Classification Search ............... 198/500, 198/493, 370.02, 370.03, 817, 370.07, 806; 184/15.1, 15.2, 15.3
See application file for complete search history.

(56) References Cited

U.S. PATENT DOCUMENTS

| | | | | |
|---|---|---|---|---|
| 4,262,776 A | * | 4/1981 | Wilson et al. | 198/500 |
| 4,537,285 A | * | 8/1985 | Brown et al. | 198/500 |
| 5,127,510 A | * | 7/1992 | Cotter et al. | 198/370.02 |
| 5,305,066 A | * | 4/1994 | Koh et al. | 198/806 |
| 5,433,679 A | * | 7/1995 | Szymczak et al. | 198/500 |
| 6,742,625 B2 | * | 6/2004 | Rodemer et al. | 198/500 |

* cited by examiner

*Primary Examiner*—James R. Bidwell
(74) *Attorney, Agent, or Firm*—Van Dyke, Gardner, Linn & Burkhart, LLP (57) ABSTRACT

A skew detection and correction system, and method of correcting skew, in a conveyor system having an endless web that is propelled in a longitudinal direction, includes providing a skew detector and determining if at least some of the cross members of the web are non-perpendicular to the longitudinal direction and providing a differential lubricant application. The lubricant applicator is responsive to the skew detector and applies a relatively greater amount of lubricant to one lateral side of the web than to the other side of the web. This causes the side of the web receiving less lubricant to stretch more than the other side to reduce the difference in the amount of stretch.

36 Claims, 14 Drawing Sheets

| Pulses Difference | Ratio | Skew B | Angle α |
|---|---|---|---|
| 1 | 0.001767 | 0.082269 | 0.101233 |
| 2 | 0.003534 | 0.164539 | 0.202466 |
| 3 | 0.005301 | 0.246808 | 0.303699 |
| 4 | 0.007067 | 0.329078 | 0.404934 |
| 5 | 0.008834 | 0.411347 | 0.506170 |
| 6 | 0.010601 | 0.493617 | 0.607407 |
| 7 | 0.012368 | 0.575886 | 0.708646 |
| 8 | 0.014135 | 0.658156 | 0.809888 |
| 9 | 0.015902 | 0.740425 | 0.911132 |
| 10 | 0.017668 | 0.822695 | 1.012379 |
| 11 | 0.019435 | 0.904964 | 1.113629 |
| 12 | 0.021202 | 0.987234 | 1.214882 |
| 13 | 0.022969 | 1.069503 | 1.316140 |
| 14 | 0.024736 | 1.151773 | 1.417401 |
| 15 | 0.026503 | 1.234042 | 1.518667 |
| 16 | 0.028269 | 1.316312 | 1.619937 |
| 17 | 0.030036 | 1.398581 | 1.721213 |
| 18 | 0.031803 | 1.480851 | 1.822494 |
| 19 | 0.033570 | 1.563120 | 1.923781 |
| 20 | 0.035337 | 1.645390 | 2.025074 |

| Skew In Inch | Zone 1 Time Off (Seconds) (Side A) | Zone 2 Time Off (Seconds) (Side B) | Zone 3 Time Off (Seconds) (Side A) | Zone 4 Time Off (Seconds) (Side B) | Zone 5 Time Off (Seconds) (Side A) | Zone 6 Time Off (Seconds) (Side B) |
|---|---|---|---|---|---|---|
| -2.00 - -9999 | 17 | 1 | 17 | 1 | 9 | 9 |
| -1.75 - -2.0 | 16 | 2 | 16 | 2 | 9 | 9 |
| -1.50 - -1.75 | 15 | 3 | 15 | 3 | 9 | 9 |
| -1.25 - -1.5 | 14 | 4 | 14 | 4 | 9 | 9 |
| -1.00 - -1.25 | 13 | 5 | 13 | 5 | 9 | 9 |
| -0.75 - -1.00 | 12 | 6 | 12 | 6 | 9 | 9 |
| -0.50 - -0.75 | 11 | 7 | 11 | 7 | 9 | 9 |
| -0.25 - -0.50 | 10 | 8 | 10 | 8 | 9 | 9 |
| 0.00 - -0.25 | 9 | 9 | 9 | 9 | 9 | 9 |
| 0.25 - 0.00 | 9 | 9 | 9 | 9 | 9 | 9 |
| 0.50 - 0.25 | 8 | 10 | 8 | 10 | 9 | 9 |
| 0.75 - 0.50 | 7 | 11 | 7 | 11 | 9 | 9 |
| 1.00 - 0.75 | 6 | 12 | 6 | 12 | 9 | 9 |
| 1.25 - 1.00 | 5 | 13 | 5 | 13 | 9 | 9 |
| 1.50 - 1.25 | 4 | 14 | 4 | 14 | 9 | 9 |
| 1.75 - 1.50 | 3 | 15 | 3 | 15 | 9 | 9 |
| 2.00 - 1.75 | 2 | 16 | 2 | 16 | 9 | 9 |
| 9999 - 2.00 | 1 | 17 | 1 | 17 | 9 | 9 |

Fig 20

SKEWED SLAT CONTROL SYSTEM FOR ARTICLE CONVEYOR

CROSS REFERENCE TO RELATED APPLICATION

This application claims priority from U.S. provisional patent application Ser. No. 60/747,953, filed on May 23, 2006, the disclosure of which is hereby incorporated herein by reference in its entirety.

BACKGROUND OF THE INVENTION

The present invention pertains to conveyor systems having an endless web that is defined by laterally extending parallel cross members that are connected at opposite ends, such as by chains, and in particular to a method of correcting skew in the cross members resulting from unequal expansion of the chains on opposite sides of the web. The invention is particularly adapted for use with article sorters, but may be applied to other such conveyor systems.

An article sorter, such as the RS200 positive displacement sorter marketed by Dematic Corporation of Grand Rapids, Mich., has an endless web that is made up elongated parallel slats that are interconnected by a matched pair of chains. The web is supported by carrier wheels attached to the sides of the chains. Because of the nature of a positive displacement sorter, wear on the chains tends to not be the same. Therefore, one chain tends to stretch more than the other chain. This can cause the slats to become skewed. Skew is where the slats, which are normally perpendicular to the direction of movement of the web, become non-perpendicular to such direction. Skew causes the carrier wheels to be at an angle to the direction of movement of the web. This causes an increase in chain drag resulting in additional energy required to propel the web as well as extra wear on the sorter. Also, excessive skew of the slats can cause problems with tracking articles on the sorter and proper diverting of the articles to the desired lanes for sortation.

Uneven elongation of the chains leads to one of the chains requiring replacement prematurely. As the chains are a matched set, uneven elongation of either chain leads to both of the chains being replaced prematurely. This is very expensive because it essentially requires an almost complete disassembly of the web.

SUMMARY OF THE INVENTION

The present invention is directed to a technique for determining that one of the two chains supporting the cross members of a conveyor has become more elongated, or stretched, than the other chain and to take corrective action to make the stretch of the chains more equal.

A skew detection and correction system, and method of correcting skew, in a conveyor system having an endless web that is propelled in a longitudinal direction, according to an aspect of the invention, includes providing a skew detector and determining if at least some of the cross members of the web are non-perpendicular to the longitudinal direction and providing a differential lubricant application. The lubricant applicator is responsive to the skew detector and applies a relatively greater amount of lubricant to one lateral side of the web than to the other side of the web. This causes the side of the web receiving less lubricant to stretch more than the other side to reduce the difference in the amount of stretch.

The lubricant applicator may be an aerosol applicator. The lubricant applicator may apply lubricant according to a duty cycle and may apply a relatively greater amount of lubricant to one lateral side of the web than to the other side by varying the duty cycle for each of the lateral sides of the web.

The skew detector may be made up of a plurality of sensors and a control. The sensors sense longitudinal position of opposite ends of at least two spaced apart cross members. The control determines skew as a function of the longitudinal positions of the opposite sides. The control may determine diagonal distances between opposite ends of the two spaced apart cross members and determine skew from differences in the diagonal distances.

Opposite lateral sides of the cross members may be interconnected by first and second endless chains and the web may be supported by first and second sets of spaced apart wheels. The lubricant applicator may apply a relatively greater amount of lubricant to one of the endless chains than to the other and/or may apply a relatively greater amount of lubricant to one of the sets of wheels than to the other.

These and other objects, advantages and features of this invention will become apparent upon review of the following specification in conjunction with the drawings.

DETAILED DESCRIPTION OF THE PREFERRED EMBODIMENT

Figure 1:
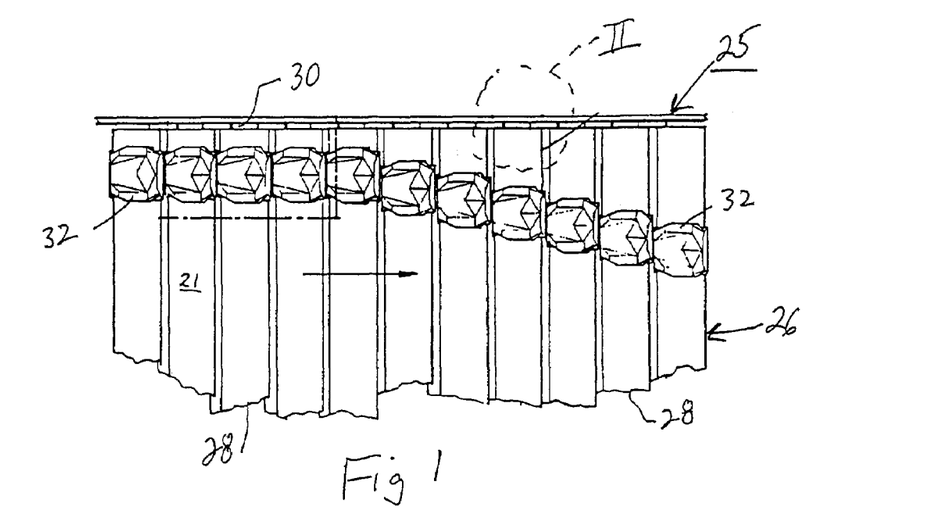
FIG. 1 is a top plan view of a conveyor system according to the invention.
Figure 2:
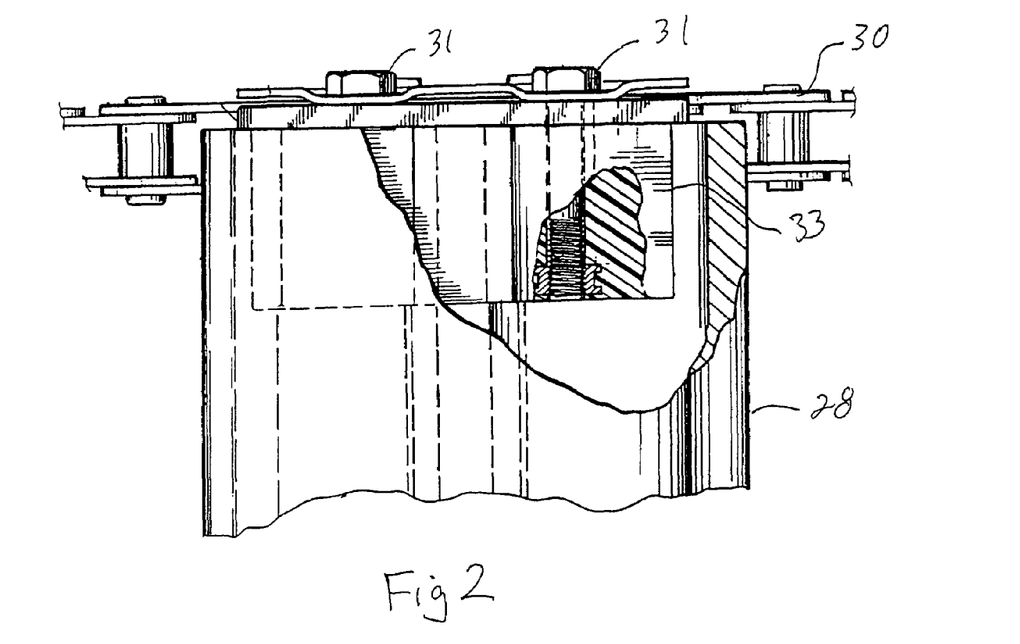
FIG. 2 is an enlarged portion of the conveyor system illustrated at II in FIG. 1.
Figure 3:
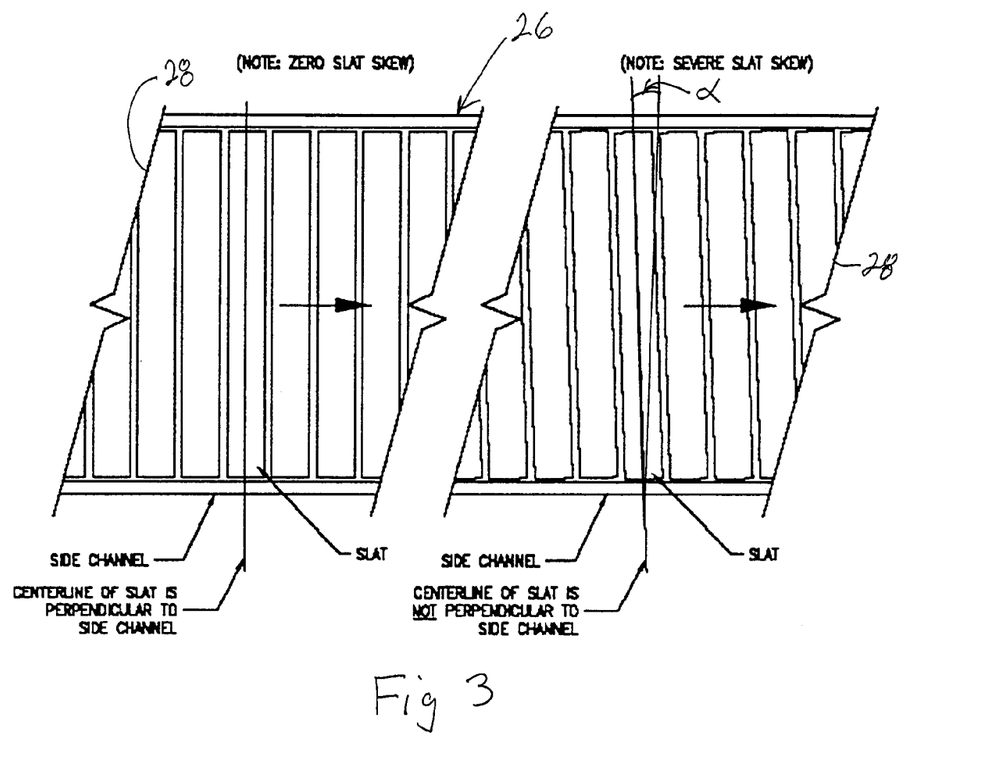
FIG. 3 is the same view as FIG. 1 illustrating skew of a cross member.

Referring now to the drawings and the illustrative embodiments depicted therein, a conveyor system 25 includes an endless web 26 made up of a plurality of cross members 28 that are interconnected at opposite ends by attaching the cross members, using fasteners 31 and special adapters 33, to left and right chains 30 (FIGS. 1-3). The endless web travels in a longitudinal direction, which is illustrated by the arrow in FIG. 1. In the illustrative embodiment, conveyor system 25 is a positive displacement shoe and slat sorter of the type disclosed in commonly assigned U.S. Pat. Nos. 4,738,347; 5,127,510; 5,165,515; 5,732,814; 5,927,465; 6,041,909; 6,513,642; 6,814,216; 6,860,383; and 6,935,483, the disclosures of which are hereby collectively incorporated herein by reference.

Figure 4:
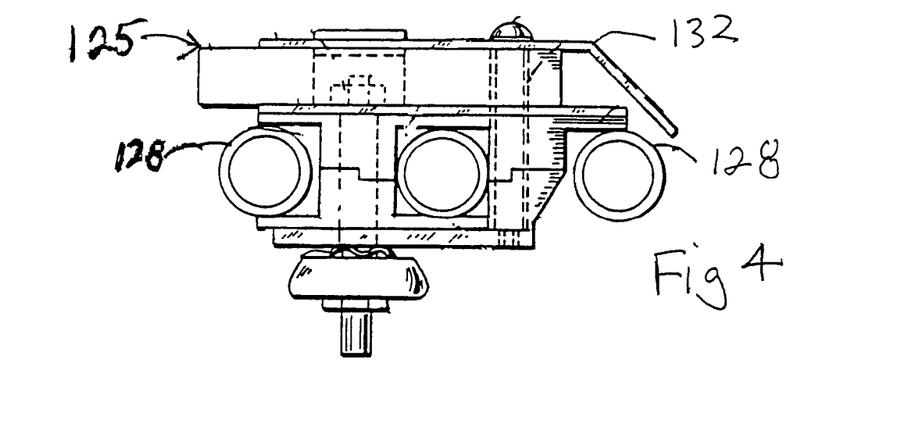
FIG. 4 is a side elevation of a conveyor system illustrating an alternative embodiment thereof.

In the embodiment illustrated in FIGS. 1 through 3, cross members 28 are closely spaced slats having generally planar upper surfaces thereby defining a flat-top conveying surface. A plurality of pusher shoes 32 is provided. Each pusher shoe selectively travels laterally along one of the cross members in order to laterally displace an article traveling on the conveying surface. This causes the article to be diverted to one of several spurs (not shown) in order to sort the articles according to some scheme. In an alternative conveyor system 125, cross members 128 are in the form of rounded tubular members and pusher shoes 132 travel along a plurality of cross-members (FIG. 4).

As can be seen by reference to FIG. 3, conveyor system 25 is subject to a condition, known as "slat skew," in which cross members 28 become non-perpendicular to the longitudinal direction of propulsion of web 26, which is indicated by the arrows in FIG. 3. The amount of slat skew is indicated by the angle $\alpha$, but also can be expressed as the difference between the position of one end of a cross member 28 from the other end of the cross member. Skew can be both plus or minus depending upon which lateral end of the slat lags the other end. Slat skew is caused when chains 30 stretch unevenly from one side of the web to the other side. As the skew on the slats increases, carrier wheels 35 will be angled to the direction of flow which pushes the web into the side wear strip (not shown) and causes an increase in chain drag. Increases in chain drag require more horsepower to pull the chain which increases the amount of electrical energy consumed. Excess slat skew may also cause article tracking and divert problems.

Figure 5:
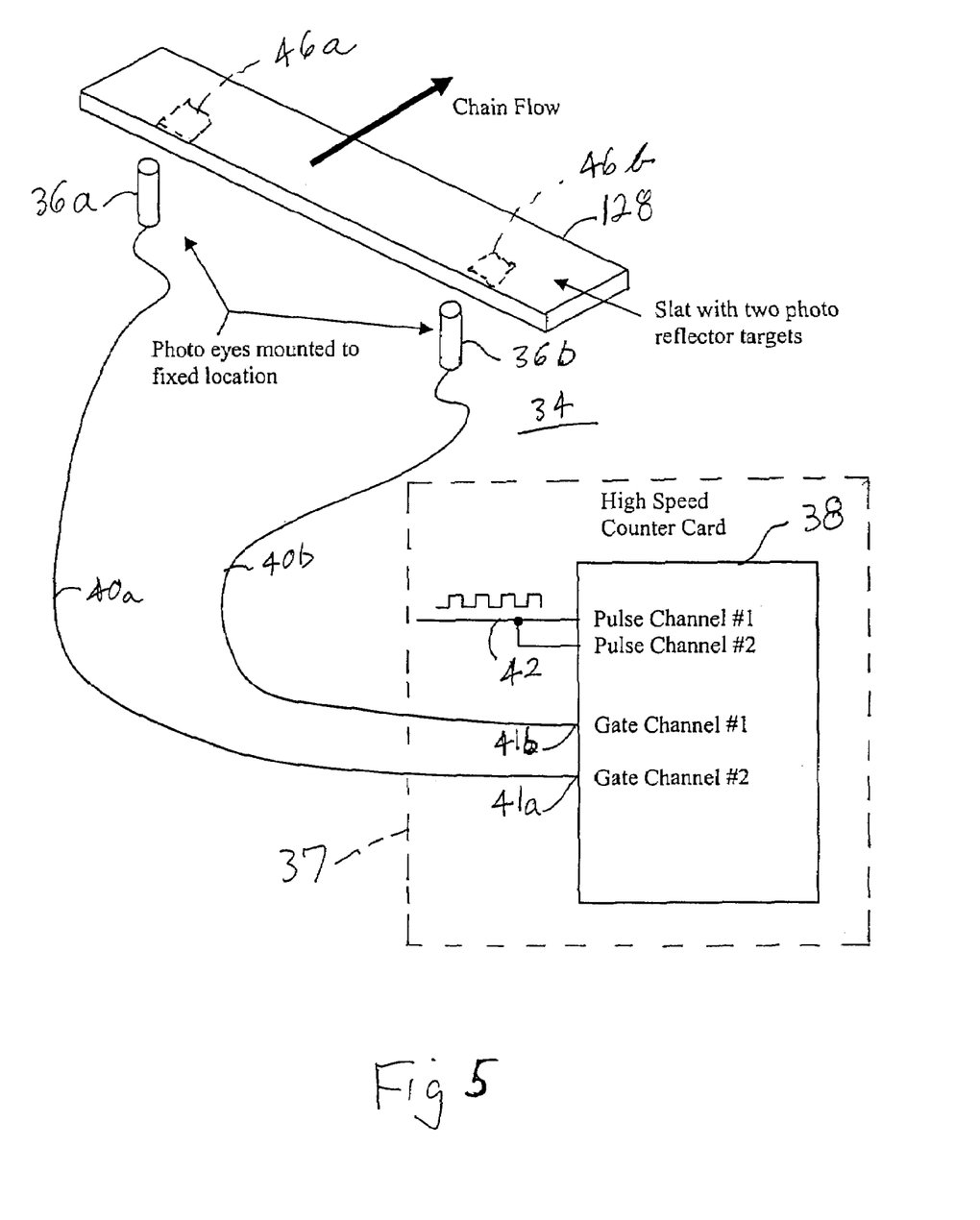
FIG. 5 is a block diagram of a skew detector system.

In order to overcome slat skew, a skew detector 34 is provided (FIG. 5). Skew detector 34 includes laterally spaced apart sensors 36a, 36b, which are positioned to identify laterally spaced apart triggers 46a, 46b on one of the slats. In the illustrative embodiment, triggers 46a, 46b are magnetic targets and sensors 36a, 36b are magnetic proximity sensors which detect the magnetic target. A pair of targets 46a, 46b are mounted to each of a "start" cross member 128 and an "end" cross member (not shown). The "start" and "end" cross members are spaced apart in web 26 by an amount that, in the illustrated embodiments, is 100 feet. While the slat spacing is not critical, it should be less than half of the web length. Sensors 36a, 36b are connected via conductors 40a, 40b with inputs 41a, 41b of a high-speed counter circuit 38. Counter circuit 38 is an input card of a control system 37, such as a programmable logic controller of the type known in the art. In the illustrative embodiment, control system 37 is a Momentum™ programmable logic controller (PLC) marketed by Modicon. A clock signal, which is 1 millisecond in the illustrated embodiments, is received on an input 42 of counter circuit 38. In operation, counter circuit 38 counts the number of clock pulses 42 beginning with the detection of the respective targets 46a, 46b on the "start" cross member 128 and ending with detection of the corresponding triggers 46a, 46b on the "end" cross member (not shown). In this manner, counter circuit 38 counts the amount of time between passage of each lateral end of the "start" cross member to the corresponding lateral end of the "end" cross member. Counter circuit 38 also counts the number of clock pulses along the diagonals between a start trigger 46a and end trigger 46b and between a start trigger 46b and end trigger 46a. The diagonal measurements are designated H1 and H2. The magnetic targets on the start and end slats may be distinguishable, such as by coding, or the like, but this is not always necessary. Skew detector 34 is positioned at an upstream end of web 26, such as where articles are placed onto the web. The reason is that web 26 is typically driven at a downstream end where all articles have been discharged from the web by a pair of sprockets driving the corresponding chains 30. The drive sprockets (not shown) are fixed to a motor-driven shaft and are thereby rotated in unison. Therefore, any skew in the cross members is not present at the discharge end, namely, the downstream end, of web 26. Idler sprockets (not shown) at the article input upstream portion of web 26 are independent freely rotatable. Therefore, slat skew is at a maximum at the article input end, namely, the upstream end, of web 26.

Figure 6:
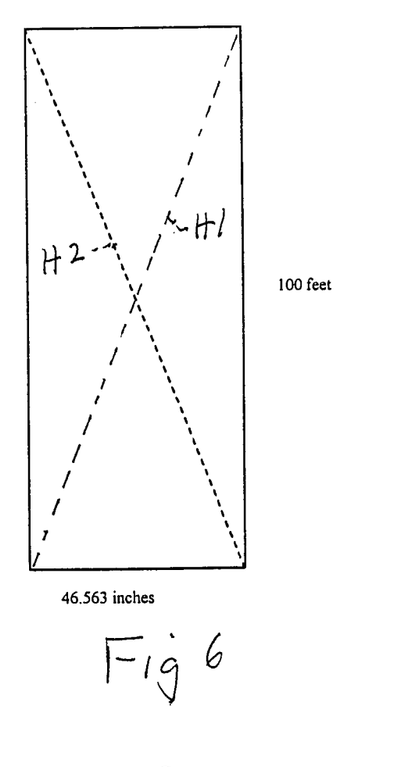
FIG. 6 is an illustration of measurement of cross members that do not exhibit skew.
Figure 7:
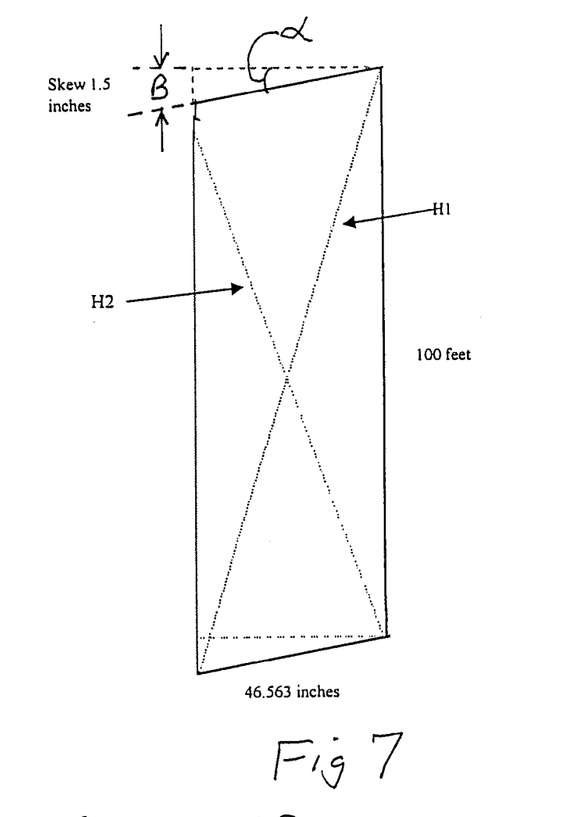
FIG. 7 is the same view as FIG. 6 with cross members that exhibit skew.
Figure 8:
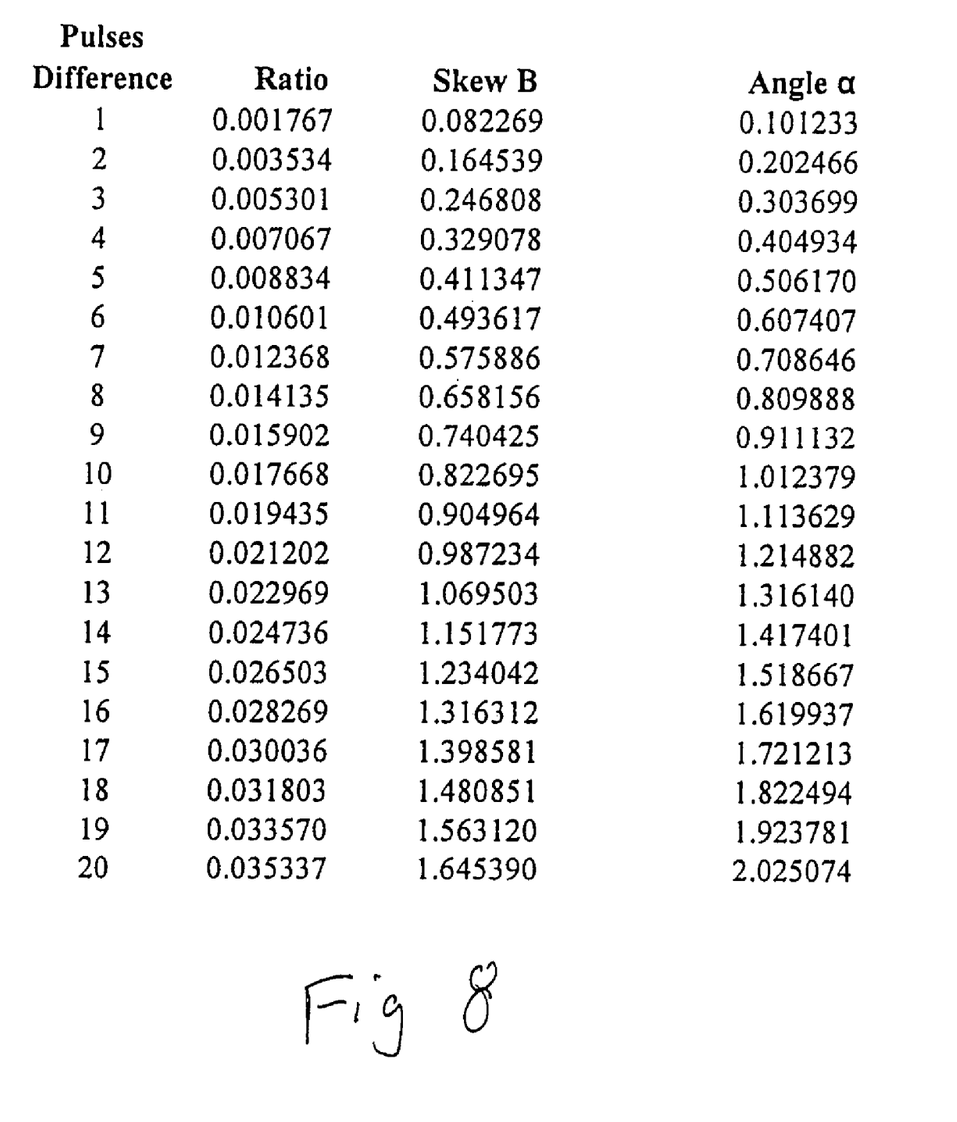
FIG. 8 is a table illustrating determination of amount of skew.

The manner in which slat skew detector 34 can measure skew in web 26 is illustrated in FIGS. 6 and 7. It can be seen that when there is no slat skew, the diagonal measurements H1 and H2 between the lateral ends of the "start" and "end" cross members are equal. Thus, when the number of pulses measured for H1 equals the number of pulses for H2 within a given tolerance, it is determined that there is no corrective action required. When the number of pulses for H1 exceeds those for H2, or vice versa, skew can be determined using the table in FIG. 8. Angle $\alpha$ is the angle of skew. "Skew B" is the amount of lag distance of one lateral end of the cross member with respect to the other lateral end of that cross member in the direction of web movement. Pulse differences can be either positive or negative. If positive, the amount of skew is as illustrated in FIG. 7. If negative, the skew is the opposite with the right lateral end of the cross members lagging behind the left lateral end of the cross members, as illustrated in FIG. 7.

Figure 9:
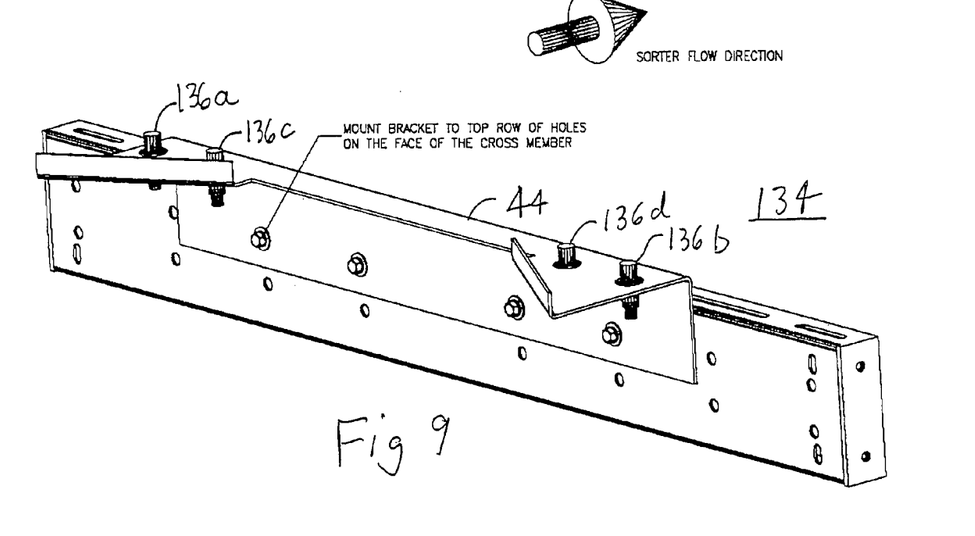
FIG. 9 is a perspective view of a skew detector assembly according to an alternative embodiment of the invention.
Figure 10:
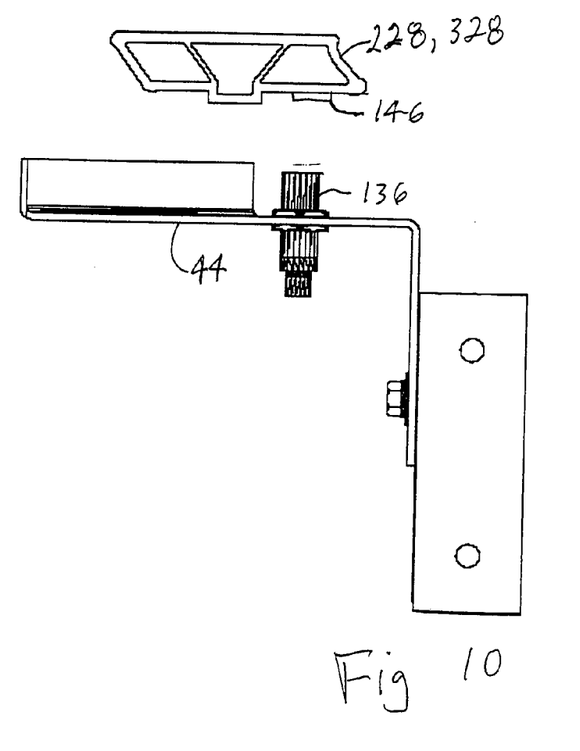
FIG. 10 is a side elevation of the skew detector assembly in FIG. 9.
Figure 11:
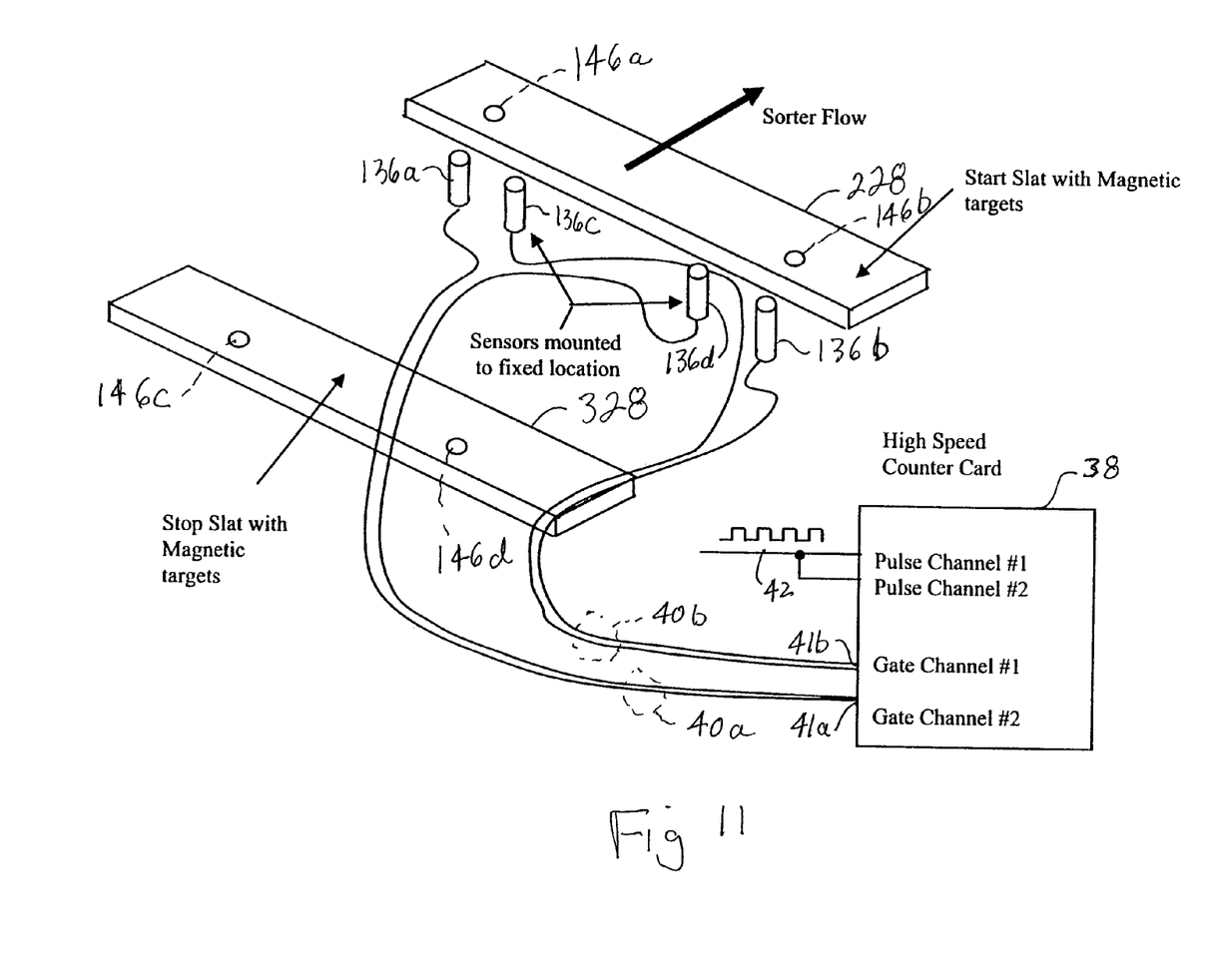
FIG. 11 is the same view as FIG. 5 of the skew detector assembly of FIGS. 9 and 10.
Figure 12:
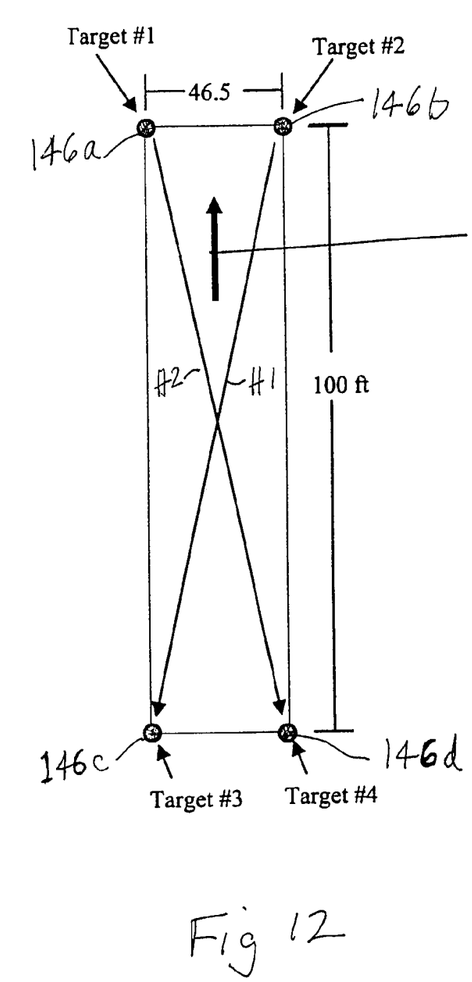
FIG. 12 is the same view as FIG. 6 using the skew detector system of FIGS. 9 through 11.
Figure 13:
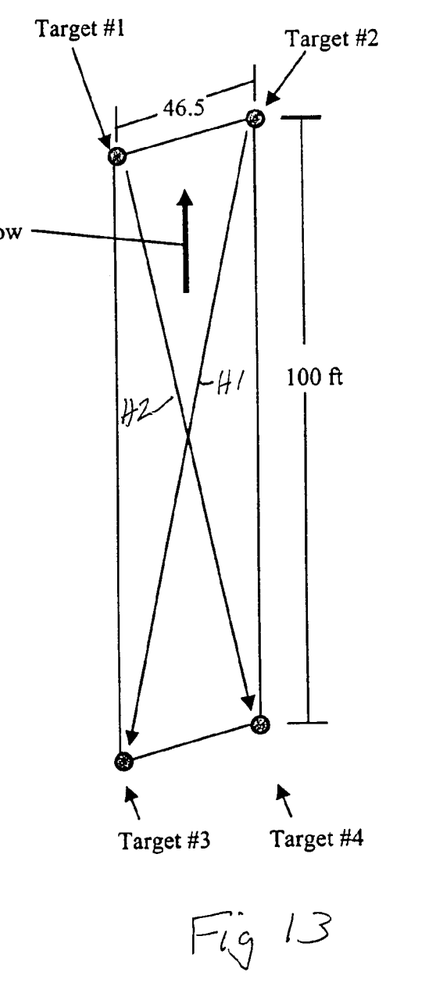
FIG. 13 is the same view as FIG. 7 using the skew detector system of FIGS. 9 through 11.

An alternative skew detector 134 includes a detector assembly 44 that is positioned below cross members 28 (FIGS. 9 and 10). Detector assembly 44 includes four detectors 136a, 136b, 136c, 136d, two of which are oriented toward each lateral end of the cross member. In the illustrative embodiment, sensors 136a-136d are magnetic sensors. Magnets 146a and 146b are positioned on a "start" cross member 228 in a position that they will be detected by sensors 136a and 136b. Two magnets 146c and 146d are positioned on "end" cross member 328 at a position that they will be detected by sensors 136c, 136d. Thus, skew detector 134 is similar to skew detector 34 except that separate sensors are used to detect the "start" cross member targets and the "end" cross member targets. Sensors 136a, 136d are connected to gate channel 41a. Sensors 136c and 136b are connected to gate channel 41b. Placement of magnets 146a-146d is illustrated in FIG. 11.

Determination of skew with skew detector 134 is similar to that for skew detector 34. There is a slight variation in measurement of diagonals H1 and H2 because the "end" triggers 146c, 146d are closer together than the "start" triggers 146a, 146b. However, any difference is minuscule over the 100-foot measurement range and is found to not appreciably affect the measurement.

Once the amount and direction of skew is determined, indicating that one of the chains 30 is stretched more than the other chain 30, a differential lubricant applicator 50 applies a lesser amount of lubricant to the less-stretched chain than to the more-stretched chain. This results in the less-stretched chain stretching more relative to the greater stretched chain, thereby resulting in the chains becoming more equal in stretch, thereby reducing the slat skew. While it may seem counterproductive to withhold lubricant from one of the two chains, it should be understood that it is the differential in the amount of stretch of the chain that results in premature wear to the chains, not the stretch of the chains, per se.

Figure 14:
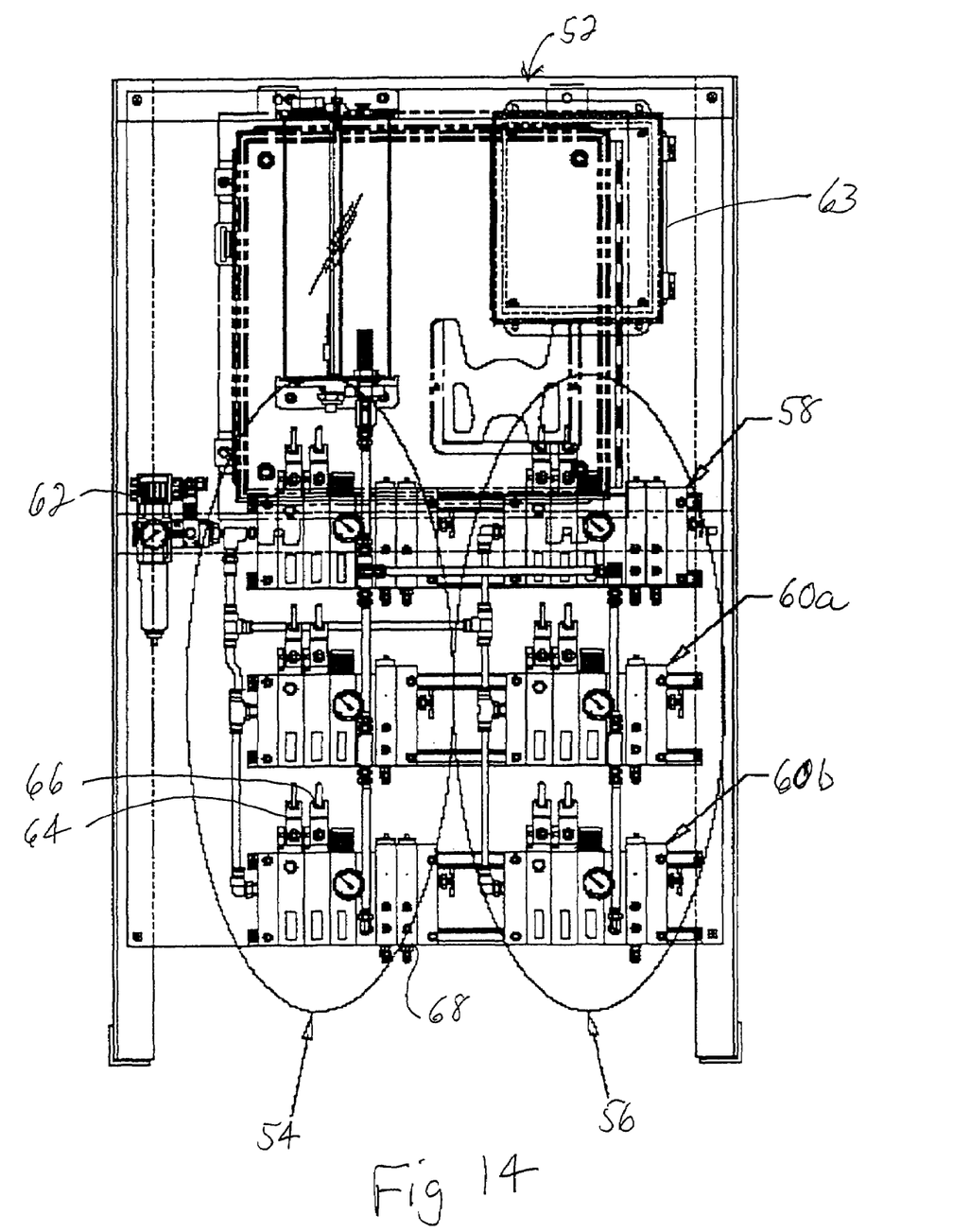
FIG. 14 is an end elevation of a manifold assembly portion of a differential lubricant applicator.

Differential lubricant applicator 50 includes a manifold assembly 52 (FIG. 14). Manifold assembly 52 includes "side A" manifolds 54 and "side B" manifolds 56. Side A manifolds 54 are connected to conveyor system 25 in order to lubricate the chain of the takeaway side of the web, namely, the side to which articles are diverted. Side B manifolds 56 are connected to conveyor system 25 in order to lubricate the chain on the other side of the web. Manifold assembly 52 includes chain manifolds 58 responsible for lubricating the chains on opposite sides of the web. Manifold assembly 52 further includes wheel manifolds 60a, 60b which are responsible for lubricating the wheels and axles at two locations on each side of the web. Manifold assembly 52 includes an air regulator 62 and a control panel 63. Each manifold includes inverter air valve 64, a nozzle air valve 66 and an injector block 68. Each lubricant manifold delivers an aerosol of oil and air mixture to the conveyor system in a manner that will be apparent to the skilled artisan. In the illustrative embodiment, differential lubricant applicator 50 is marketed by Orsco under Model No. VSR-0038-6-8 or equivalent lubrication system.

Figure 15A:
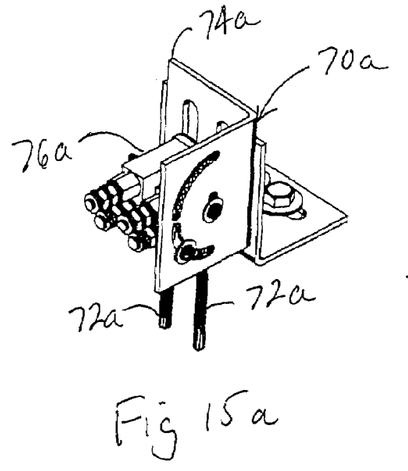
FIGS. 15a and 15b are respective left and right side chain nozzle assemblies of the differential lubricant applicator.
Figure 15B:
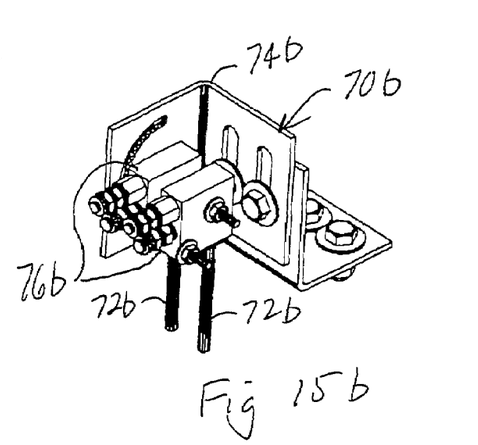
Figure 17:
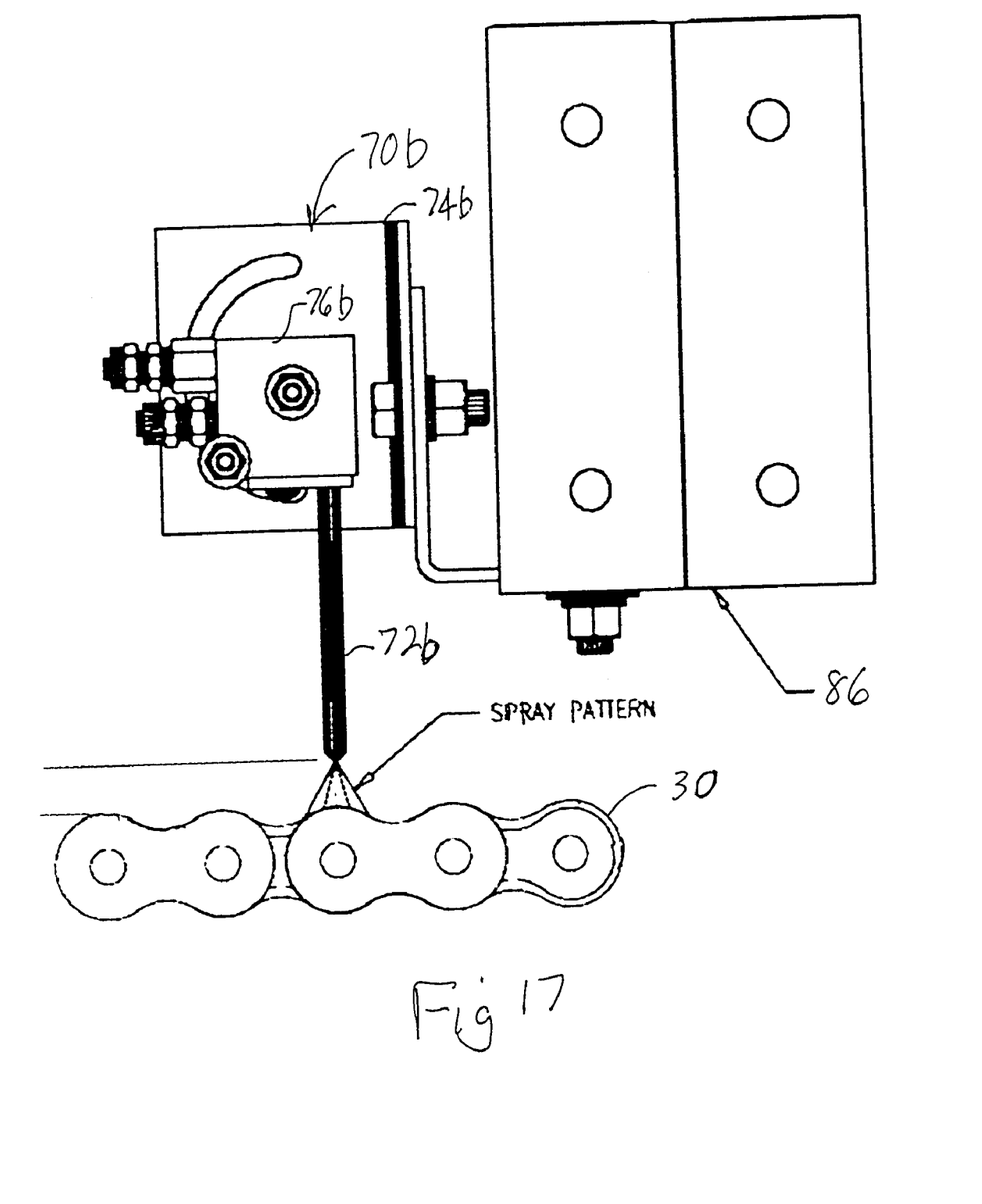
FIG. 17 is a side elevation of a chain nozzle assembly lubricating a chain.

Chain manifolds 58 deliver the lubricant aerosol to left and right chain lubricant nozzle assemblies 70a, 70b (15a, 15b). Each chain lubricant nozzle assembly includes a pair of nozzle tips 72a, 72b which lubricate the chain links on opposite sides of the respective chain. The nozzle assembly includes a mounting bracket 74 for mounting to a convenient portion of the conveyor system 25 and a body 76a, 76b for connecting with tubing (not shown) leading back to chain manifold 58 and for conveying the aerosol to nozzle tip 72a, 72b. In the illustrative embodiment, each nozzle tip 72a, 72b is approximately three inches in length having a zero-degree spray pattern which produces a vertical cone, as is best illustrated in FIG. 17.

Figure 16A:
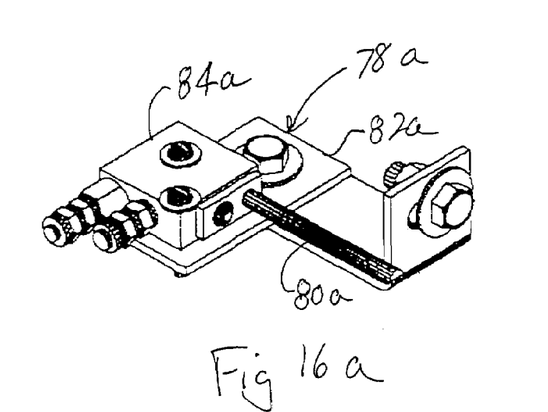
FIGS. 16a and 16b are respective left and right side wheel lubricant nozzle assemblies of the differential lubricant applicator.
Figure 16B:
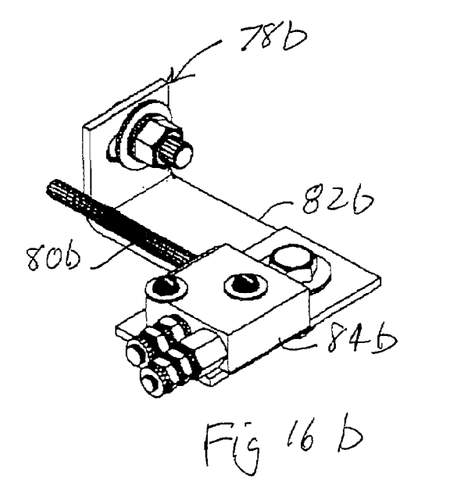
Figure 18:
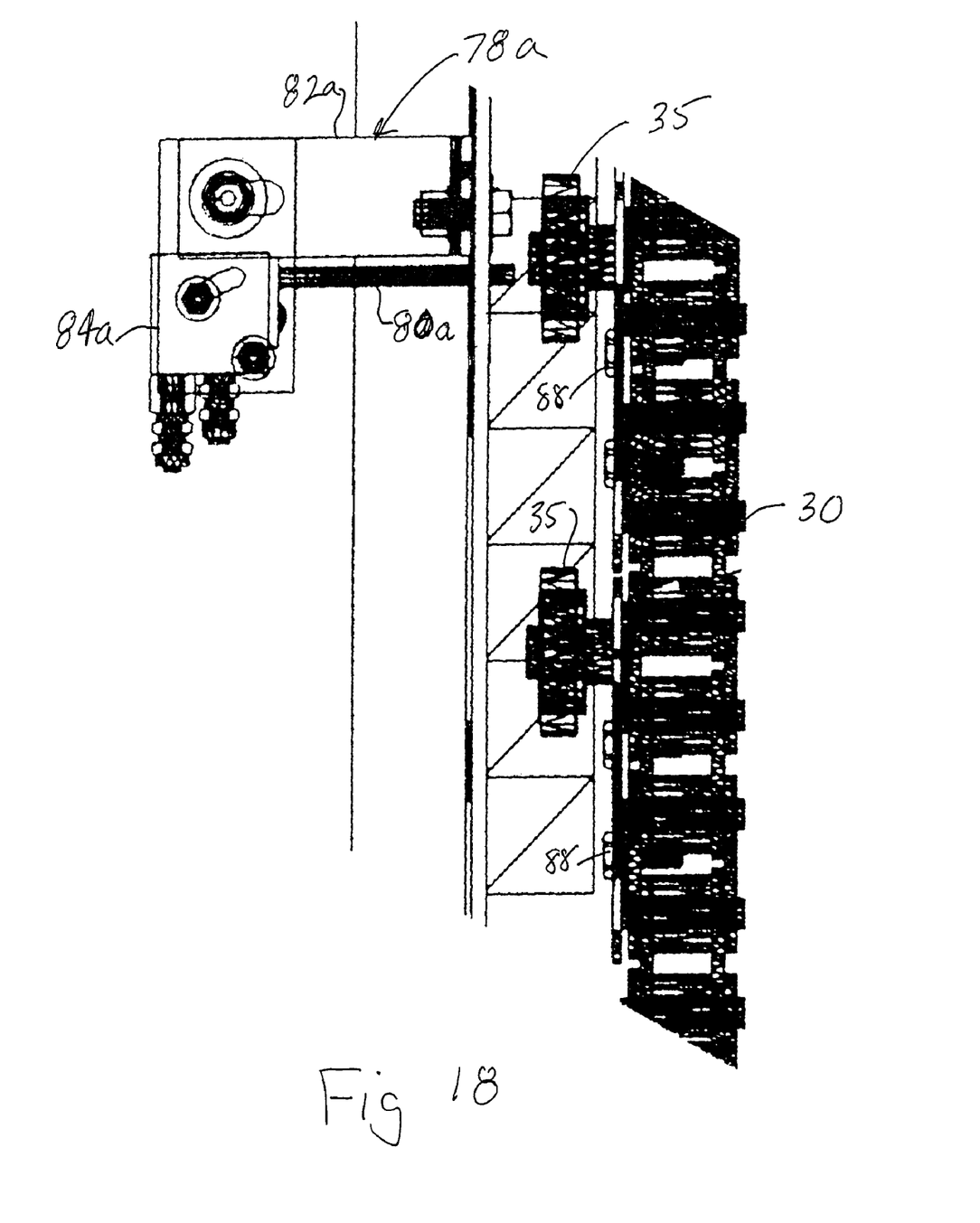
FIG. 18 is a top plan view of a wheel lubricant nozzle assembly lubricating a wheel.

Wheel manifolds 60a, 60b lead to a wheel/axle lubricant nozzle assembly 78a, 78b (FIGS. 16a, 16b). Each wheel/axle lubricant nozzle assembly includes a horizontally oriented nozzle tip 80a, 80b extending from a body 84a, 84b. Each body 84a, 84b connects with tubing (not shown) leading to the respective wheel manifold 60a, 60b and provides the lubricant aerosol to the corresponding nozzle tip 80a, 80b. A mounting bracket 82a, 82b mounts the body and, hence, the nozzle tip to the conveyor system at a convenient location. The purpose of the wheel/axle lubricant nozzle assembly is to apply lubricant to the circumference of a carrier wheel 35 and the axle face of each carrier plate 88 (FIG. 18). Two wheel/axle lubricant nozzle assemblies are provided on each side of conveyor system 25. Nozzle tip 88a, 88b in the illustrative embodiment is approximately three inches in length and has a 45 degree spray pattern which produces a cone of aerosol at an approximate 45 degree angle.

Figure 19:
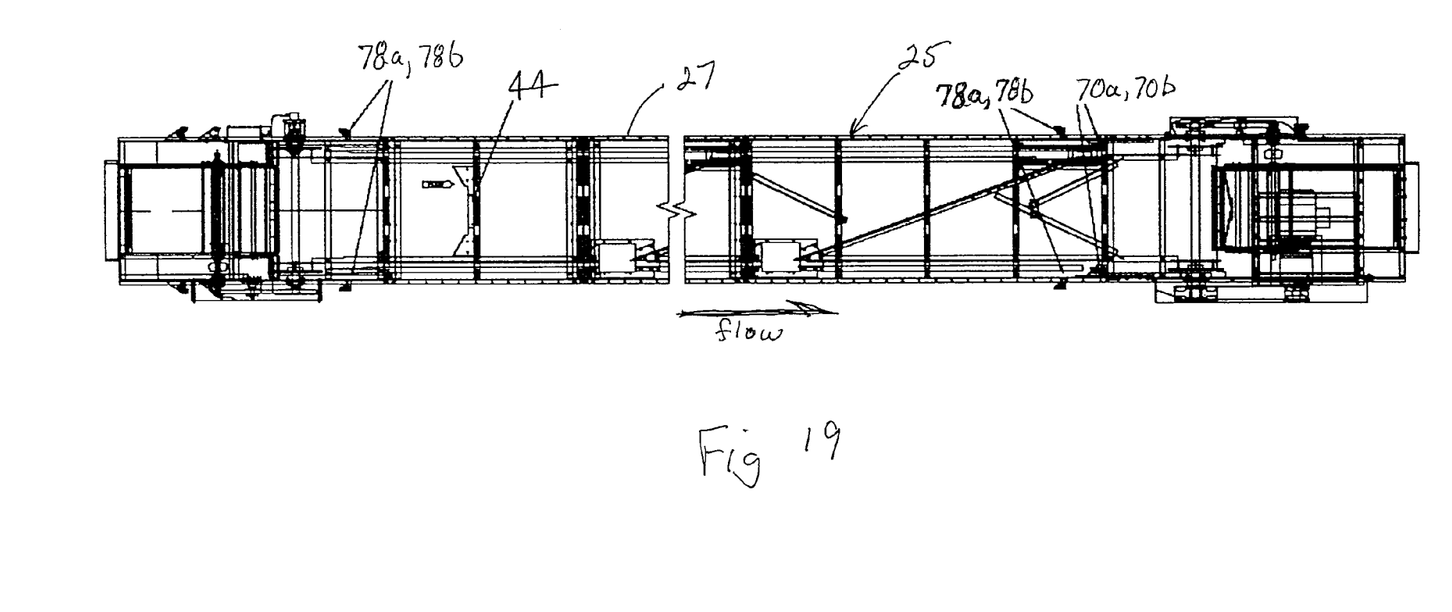
FIG. 19 is a top plan view of an article sorter frame illustrating placement of chain and wheel lubricant nozzle assemblies.

Positioning of nozzle assemblies 70a, 70b, 78a, 78b with respect to the frame of conveyor system 25 is illustrated in FIG. 19. The wheel/axle nozzle assemblies 78a, 78b are mounted at both the charge and discharge ends of the conveyor system as illustrated respectively to the left and right ends of frame assembly 27 in FIG. 19. The chain lubricant nozzle assemblies 70a, 70b are mounted at the discharge end, or downstream end, of conveyor system 25, to the right as illustrated in FIG. 19. The chain lubricant nozzle assemblies are positioned inside the catenary bed. However, it should be understood that the positioning of the nozzle assemblies is for illustration purposes only and other locations may be apparent to the skilled artisan.

Figure 20:
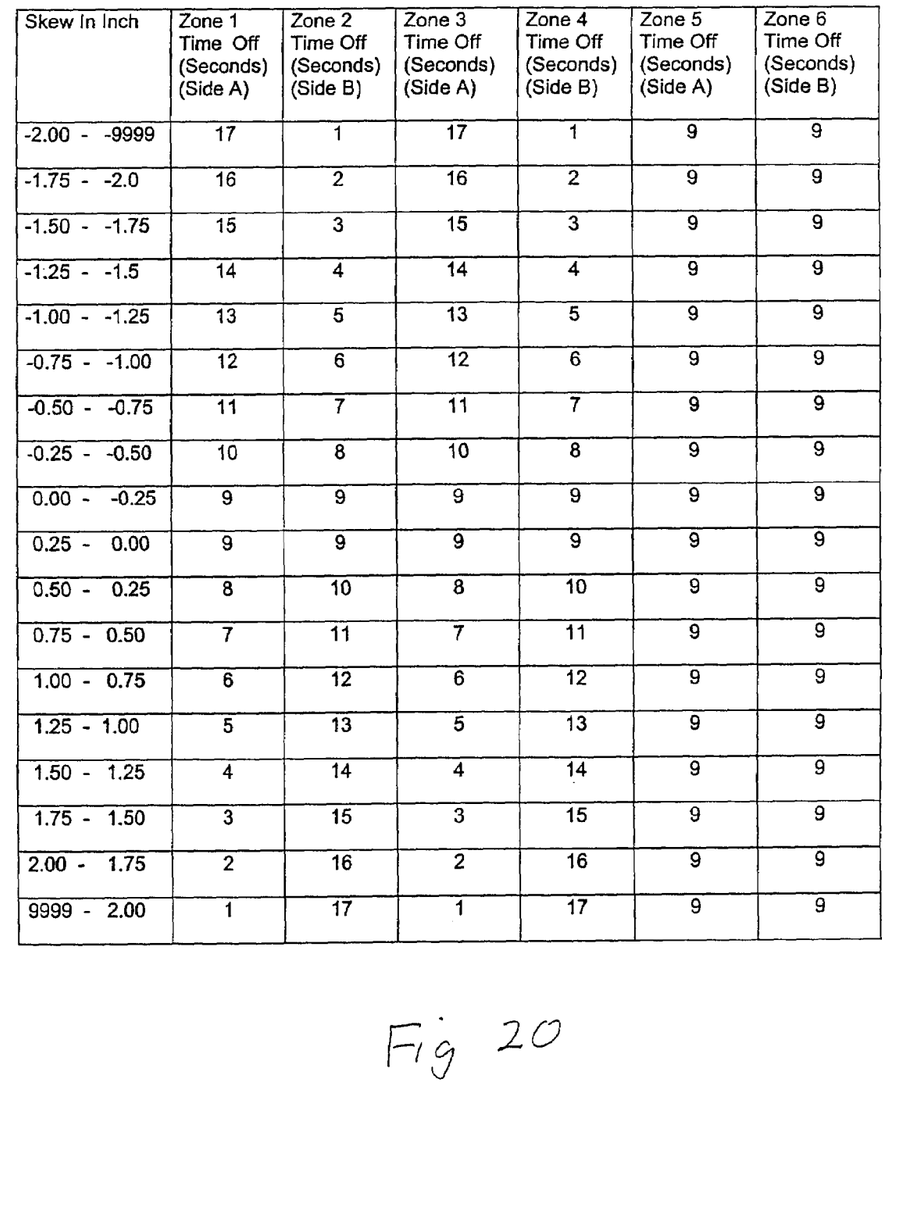
FIG. 20 is a diagram illustrating use of duty cycle variation for differential application of lubricant.

In order to differentially lubricate chains 30, differential lubricant applicator 50 causes lubricant to be applied during an "on" period and not applied during an "off" period thereby establishing an application duty cycle. If it is desirable to apply more lubricant to a particular chain, the duty cycle is increased by decreasing the off time of the nozzle assembly. If it is desired to apply less lubricant to a particular chain, the duty cycle is decreased by increasing the off time of the respective nozzle assembly. One scheme for carrying out such differential lubrication is illustrated in FIG. 20. FIG. 20 illustrates six columns illustrating the off cycles for the two chain lubricant nozzle assemblies 70a, 70b and the four wheel/axle lubricant nozzles 78a, 78b. The corresponding "on" time is about one (1) second. The horizontal rows correspond to the amount of skew that is measured by skew detector 34, 134. As previously set forth, skew can be negative or positive values depending upon which lateral end of the cross members lags the other lateral end. It can be seen that for small amounts of skew, only slight variations in duty cycle are provided for opposite sides of the web. Thus, for small amounts of skew in the cross members, only a slightly greater amount of lubricant is applied to the stretched chain than to the opposite chain. However, for large amounts of skew in the cross members, almost all of the lubricant is applied to the stretched chain and little to the unstretched chain.

Variations may be made in the illustrated embodiments without departing from the scope of the invention. For example, although the differential lubricant applicator is illustrated as an aerosol applicator, mechanical applicators or drip lubricant applicators may be utilized. Also, although the skew detection is illustrated via an automated system, manual measurements of skew may also be utilized especially where the conveyor system is shut down for certain periods of the day, thus enabling skew to be manually measured. Although the invention was illustrated with a sortation conveyor, the conveyor system may, alternatively, be a slat conveyor, a traveling walkway, a baggage carrousel, or the like.

Changes and modifications in the specifically described embodiments can be carried out without departing from the principles of the invention which is intended to be limited only by the scope of the appended claims, as interpreted according to the principles of patent law including the doctrine of equivalents.

The invention claimed is:

1. A method of correcting skew in a conveyor system having an endless web that is propelled in a longitudinal direction, said web defined by a plurality of laterally extending parallel cross members that are interconnected at opposite ends, said method comprising:

determining if at least some of the cross members are non-perpendicular to the longitudinal direction; and applying a relatively greater amount of lubricant to one lateral side of said web than to the other lateral side of said web in response to said determining.

2. The method of claim 1 including providing an aerosol applicator and applying lubricant with said aerosol applicator.

3. The method of claim 1 wherein said determining includes sensing longitudinal positions of opposite ends of at least two spaced apart cross members and determining if at least some of the cross members are non-perpendicular to the longitudinal direction as a function of the longitudinal positions of said opposite ends of at least two spaced apart cross members.

4. The method of claim 3 including determining if at least some of the cross members are non-perpendicular to the longitudinal direction by sensing diagonal distances between said opposite ends of said at least two spaced apart cross members.

5. The method of claim 3 including providing sensors and sensing longitudinal positions of said opposite ends of at least two spaced apart cross members with said sensors.

6. The method of claim 5 wherein said sensors comprise at least one chosen from magnetic sensors, proximity sensors and photo sensors.

7. The method of claim 1 wherein said determining includes identifying which lateral side of said web has stretched more than the other lateral side of said web and wherein said applying includes applying more lubricant to the lateral side of said web that has stretched more than the other lateral side.

8. The method of claim 1 wherein said applying includes applying lubricant according to a duty cycle including applying relatively greater lubricant to one lateral side of said web than to the other lateral side of said web by varying the duty cycle for each of said lateral sides.

9. The method of claim 1 wherein opposite ends of said cross members are interconnected by first and second endless chains and wherein said applying includes applying a relatively greater amount of lubricant to one of said endless chains than to the other of said endless chains.

10. The method of claim 9 wherein one lateral side of said web is supported by a first set of spaced apart support wheels and the opposite lateral side of said web is supported by a second set of spaced apart support wheels and wherein said applying includes applying a relatively greater amount of lubricant to one of said set of spaced apart support wheels than to the other of said spaced apart support wheels.

11. The method of claim 1 wherein one lateral side of said web is supported by a first set of spaced apart support wheels and the opposite lateral side of said web is supported by a second set of spaced apart support wheels and wherein said applying includes applying a relatively greater amount of lubricant to one of said set of spaced apart support wheels than to the other of said spaced apart support wheels.

12. A skew detection and correction system for use with a conveyor system having an endless web that is propelled in a longitudinal direction, said web defined by a plurality of laterally extending parallel cross members that are interconnected at opposite ends, said detection and correction system comprising:

a skew detector, said detector detecting if at least some of said cross members are non-perpendicular to the longitudinal direction; and a differential lubricant applicator, said lubricant applicator responsive to said skew detector to apply a relatively greater amount of lubricant to one lateral side of said web than to the other lateral side of said web.

13. The system of claim 12 wherein said lubricant applicator comprises an aerosol applicator.

14. The system of claim 12 wherein said skew detector comprises a plurality of sensors and a control, said sensors sensing longitudinal positions of opposite ends of at least two spaced apart cross members, said control determining skew as a function of the longitudinal positions of said opposite ends of said at least two spaced apart cross members.

15. The system of claim 14 wherein said control determines skew as a function of diagonal distances between opposite ends of said at least two spaced apart cross members.

16. The system of claim 15 wherein said sensors comprise at least one chosen from magnetic sensors, proximity sensors and photo sensors.

17. The system of claim 14 wherein said sensors comprise at least one chosen from magnetic sensors, proximity sensors and photo sensors.

18. The system of claim 12 wherein said skew detector determines if one lateral side of said web has stretched more than the other lateral side of said web and wherein said lubricant applicator applies more lubricant to the lateral side of said web that has stretched more than the other lateral side.

19. The system of claim 12 wherein said lubricant applicator applies lubricant according to a duty cycle and wherein said lubricant applicator applies relatively greater lubricant to one lateral side of said web than to the other lateral side of said web by varying the duty cycle for each of said lateral sides.

20. The system of claim 12 wherein opposite ends of said cross members are interconnected by first and second endless chains and wherein said lubricant applicator applies a relatively greater amount of lubricant to one of said endless chains than to the other of said endless chains.

21. The system of claim 20 wherein one lateral side of said web is supported by a first set of spaced apart support wheels and the opposite lateral side of said web is supported by a second set of spaced apart support wheels and wherein said lubricant applicator applies a relatively greater amount of lubricant to one said set of spaced apart support wheels than to the other said set of spaced apart support wheels.

22. The system of claim 12 wherein one lateral side of said web is supported by a first set of spaced apart support wheels and the opposite lateral side of said web is supported by a second set of spaced apart support wheels and wherein said lubricant applicator applies a relatively greater amount of lubricant to one said set of spaced apart support wheels than to the other said set of spaced apart support wheels.

23. A conveyor system, comprising:

an endless web that is propelled in a longitudinal direction, said web defined by a plurality of laterally extending parallel cross members that are interconnected at opposite ends;

a skew detector, said detector detecting if at least some of said cross members are non-perpendicular to the longitudinal direction; and a differential lubricant applicator, said lubricant applicator responsive to said skew detector to apply a relatively greater amount of lubricant to one lateral side of said web than to the other lateral side of said web.

24. The system of claim 23 wherein said lubricant applicator comprises an aerosol applicator.

25. The system of claim 23 wherein said skew detector comprises a plurality of sensors and a control, said sensors sensing longitudinal positions of opposite ends of at least two spaced apart cross members, said control determining skew as a function of the longitudinal positions of said opposite ends of at least two spaced apart cross members.

26. The system of claim 25 wherein said control determines skew as a function of diagonal distances between opposite ends of said at least two spaced apart cross members.

27. The system of claim 26 wherein said sensors comprise at least one chosen from magnetic sensors, proximity sensors and photo sensors.

28. The system of claim 25 wherein said sensors comprise at least one chosen from magnetic sensors, proximity sensors and photo sensors.

29. The system of claim 23 wherein said skew detector determines if one lateral side of said web has stretched more than the other lateral side of said web and wherein said lubricant applicator applies more lubricant to the lateral side of said web that has stretched more than the other lateral side.

30. The system of claim 23 wherein said lubricant applicator applies lubricant according to a duty cycle and wherein said lubricant applicator applies relatively greater lubricant to one lateral side of said web than to the other lateral side of said web by varying the duty cycle for each of said lateral sides.

31. The system of claim 23 wherein opposite ends of said cross members are interconnected by first and second endless chains and wherein said lubricant applicator applies a relatively greater amount of lubricant to one of said endless chains than to the other of said endless chains.

32. The system of claim 31 wherein one lateral side of said web is supported by a first set of spaced apart support wheels and the opposite lateral side of said web is supported by a second set of spaced apart support wheels and wherein said lubricant applicator applies a relatively greater amount of lubricant to one said set of spaced apart support wheels than to the other said set of spaced apart support wheels.

33. The system of claim 23 wherein one lateral side of said web is supported by a first set of spaced apart support wheels and the opposite lateral side of said web is supported by a second set of spaced apart support wheels and wherein said lubricant applicator applies a relatively greater amount of lubricant to one said set of spaced apart support wheels than to the other said set of spaced apart support wheels.

34. The system of claim 23 wherein said web defines a sortation system conveying surface and further including a plurality of pusher shoes traveling along said cross members, said pusher shoes laterally displacing articles on said conveying surface.

35. The system of claim 23 wherein said cross members comprise slats, said slats having generally planar upper surface.

36. The system of claim 23 wherein said cross members are tubular members.

\* \* \* \* \*